United States Patent [19]

Yonekawa et al.

[11] 3,787,263
[45] Jan. 22, 1974

[54] METHOD OF AND APPARATUS FOR STICKING AN APEX RUBBER STRIP ON BEAD RINGS FOR USE IN PNEUMATIC TIRES

[75] Inventors: Hisashi Yonekawa; Minoru Miyaoka; Norio Abe, all of Tokyo, Japan

[73] Assignee: Bridgestone Tire Company Limited, Tokyo, Japan

[22] Filed: Dec. 15, 1971

[21] Appl. No.: 208,237

[30] Foreign Application Priority Data
Dec. 19, 1970   Japan.............................. 45-113587

[52] U.S. Cl.................. 156/136, 156/422, 156/460, 156/185, 156/446, 156/481, 156/530
[51] Int. Cl............................................. B29h 17/34
[58] Field of Search ... 156/131, 132, 136, 422, 460, 156/185, 193, 446, 481, 530

[56] References Cited
UNITED STATES PATENTS

| 1,651,735 | 12/1927 | Shively........................... 156/422 X |
| 1,759,669 | 5/1930 | Stevens........................... 156/422 X |
| 1,855,426 | 4/1932 | Stevens.............................. 156/422 |
| 1,871,119 | 8/1932 | Denmire.............................. 156/460 |
| 3,654,007 | 4/1972 | Winstanley et al. ................ 156/132 |
| 3,698,987 | 10/1972 | Woodhall et al. .................... 156/132 |

Primary Examiner—Clifton B. Cosby
Attorney, Agent, or Firm—Martin Fleit et al.

[57] ABSTRACT

A method of and apparatus for automatically sticking an apex rubber strip on bead rings for use in pneumatic tires on mass production basis are provided whereby a number of bead rings may be fed to and disposed on a pair of driving rollers one by one and a continuous apex rubber strip may be fed to the outer periphery of each bead ring. Successive steps of sticking the forward end of the apex rubber strip on the outer periphery of each bead ring, rotating the driving rollers, detecting the arrival of the forward end of the apex rubber strip stuck on the outer periphery of each bead ring at its final position around the bead ring, obliquely cutting the rear end of one turn of the apex rubber strip, re-starting the rotation of the driving rollers and sticking the rear end of the apex rubber strip thus cut on the bead ring, and replacing the bead ring with a new bead ring, are performed automatically.

2 Claims, 25 Drawing Figures

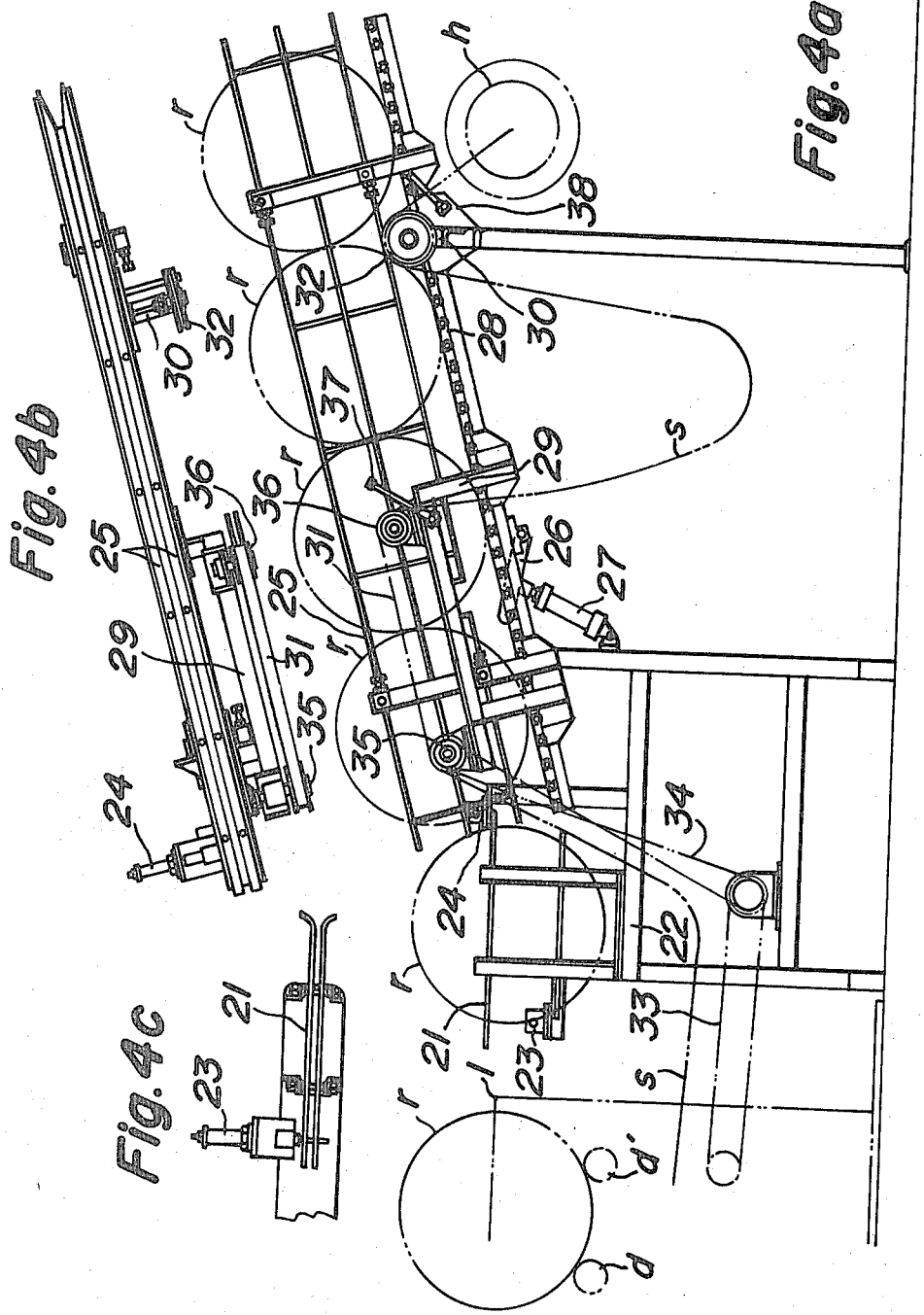

METHOD OF AND APPARATUS FOR STICKING AN APEX RUBBER STRIP ON BEAD RINGS FOR USE IN PNEUMATIC TIRES

The present invention relates to a method of sticking an apex rubber strip on bead rings for use in pneumatic tires and to apparatus for carrying out the method.

In case of manufacturing pneumatic tires, heretofore, it has been the common practice to use bead rings $r$ each made up of a bundle of wires (FIG. 1) for reinforcing the bead portion of a tire. The bead ring $r$ is subjected to wrapping or covering treatment and surrounded by a carcass ply $y$ which is folded at the inner periphery as well as at both side surfaces of the bead ring $r$. In order to make the folded end $y'$ of the carcass ply $y$ in parallel with the outer periphery of the bead ring $r$, the end of the carcass ply $y$ is bent in two steps so that the bond between the bead ring $r$ and the carcass ply $y$ becomes weak with respect to the tension subjected to the carcass ply $y$. In order to obviate such disadvantage an annular cavity $v$ having a triangular section is formed by the carcass ply $y$ its end $y'$ is filled up with a rubber ring $z$ which is thus stuck on the outer periphery of the bear ring $r$. This rubber ring $z$ is called a stiffner or filler when the region of the above mentioned cavity $v$ is long in the radial direction of the tire or is called as apex when the region of the cavity $v$ is short in the radial direction of the tire.

Heretofore, it has been the common practice to manually stick the apex rubber ring $z$ on the bead ring $r$ with the result that the pneumatic tire could not reliably and efficiently be manufactured on automatic and mass production basis without undesirable problems of manual handlings arising.

The principal object of the invention is to provide a method of sticking an apex rubber strip on bead rings for use in pneumatic tires, which can eliminate the above mentioned prior art problems arising from manual handlings.

A further object is the provision of an apparatus for sticking an apex rubber strip on bead rings for use in pneumatic tires, which is capable of attaining automatic sticking of an apex rubber strip on bead rings and contributing to the tire manufacturing industry.

Preferred embodiments of the present invention are illustrated in the following drawings, in which:

FIG. 4a is a front elevation of the relative arrangement of the mechanism for feeding bead rings and an apex rubber strip which is essential for the invention;

FIGS. 4b and 4c are plan views of detached parts of a detail of FIG. 4a, respectively;

A practical embodiment for carrying out the method according to the invention will be described with reference to FIGS. 2a to 2h.

Figure 1:
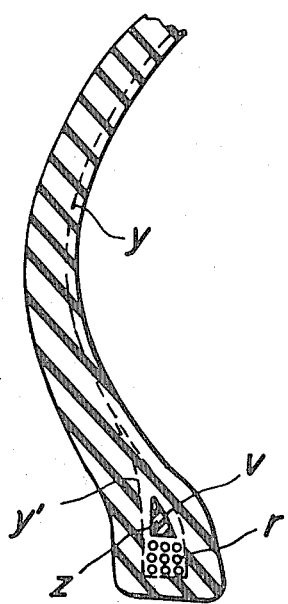
FIG. 1 shows a section through a bead portion of a pneumatic tire.
Figure 2A:
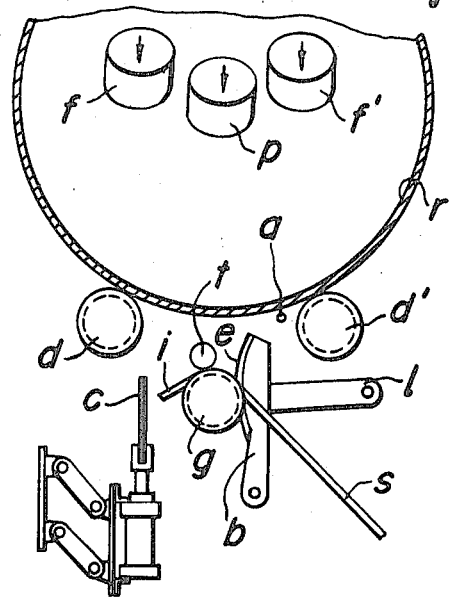
FIGS. 2a to 2h show diagrammatically a section of the relative arrangement of the main parts which are essential for the invention and for explaining the steps of carrying out the method according to the invention.
Figure 2B:
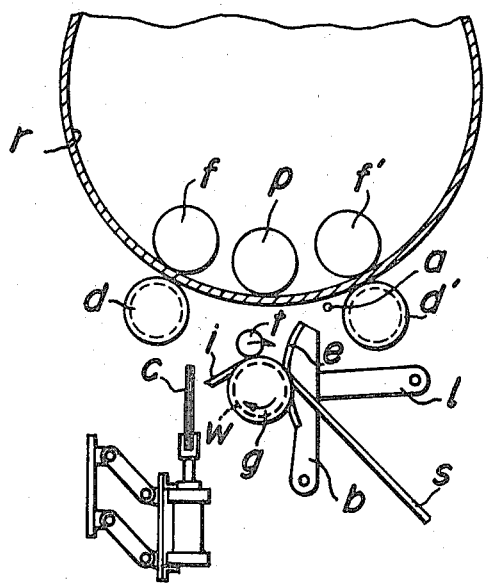

In the present invention, a bead ring $r$ is disposed on a pair of driving roller $d$ and $d'$ as shown in FIG. 2a and a pressure roller $p$ and driven rollers $f$ and $f'$ are slightly urged against that arcuate region of the bead ring $r$ which lies between the driving rollers $d$ and $d'$ so as to correct the curvature of the arcuate region of the bead ring $r$ as shown in FIG. 2b.

Near the arcuate region of the bead ring $r$ whose curvature is corrected is arranged a swing lever $l$ which is provided at its front end with a guide roller $g$. The guide roller $g$ is so mounted that it can be moved upwards and downwards with respect to the bead ring $r$. Provision is made for a touch roller $t$ which when in contact with the guide roller $g$ is adapted to bite the apex rubber strip $s$ therebetween and feed it towards the bead ring $r$.

Figure 2C:
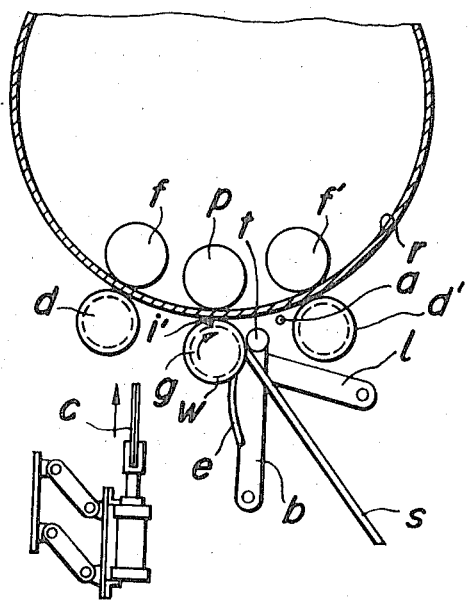
Figure 2D:
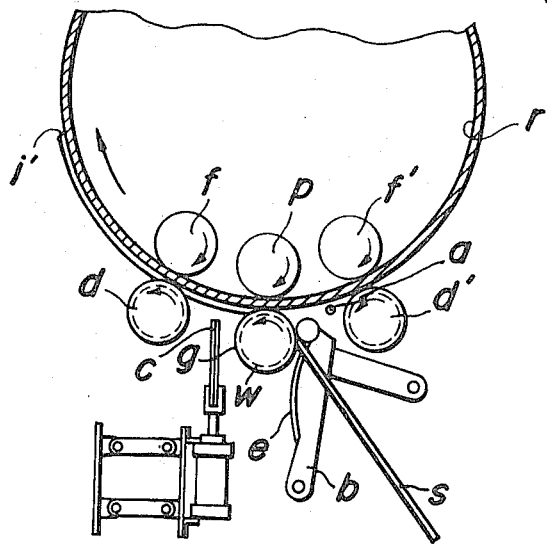
Figure 2E:
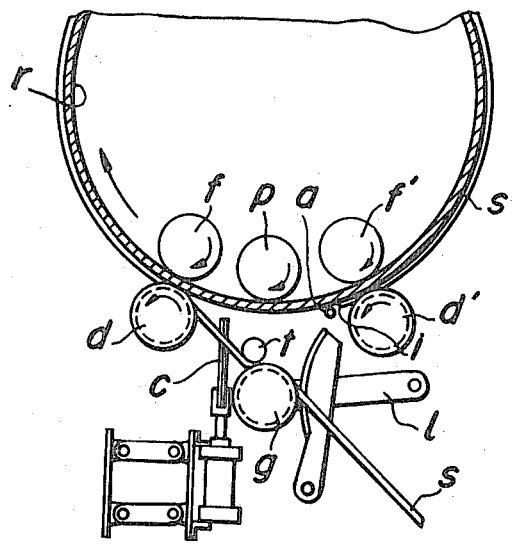

The guide roller $g$ which becomes in contact with the bead ring $r$ as shown in FIG. 2c is rotated in a direction opposite to the feeding direction of the apex rubber strip $s$ to bring back an obliquely cut end $i'$ of the apex rubber strip $s$ to the point of contact between the guide roller $g$ and the bead ring $r$, thereby urging the obliquely cut end $i'$ against the arcuate portion of the bead ring $r$. Subsequently, the guide roller $g$ is freely rotated and a restraining guide piece $b$ is released, thereby permitting a free feed of the apex rubber strip $s$ along the outer periphery of the bead ring $r$ as shown in FIG. 2d. At both sides of the arcute region of the bead ring $r$ whose curvature is corrected are arranged a device for detecting the arrival of the front end $i'$ of the apex rubber strip $s$ which is stuck on the bead ring $r$ such, for example, as an air senser $a$ on the one hand and a cutter $c$ for cutting the apex rubber strip $s$ on the other hand as shown in FIG. 2e.

At first, the pressure roller $p$ together with the driven rollers $f$ and $f'$ are retracted from the bead ring $r$ to a position shown in FIG. 2a. The guide roller $g$ and the touch roller $t$ carrying and holding the obliquely cut end $i$ of the apex rubber strip $s$ therebetween are located below that arcuate portion of the bead ring $r$ which lies between the driving rollers $d$ and $d'$. The cutter $c$ occupies an inoperative position.

Then, the bead ring $r$ is disposed on the driving rollers $d$ and $d'$ as shown in FIG. 2a and hence the pressure roller *p* and the driven rollers *f* and *f'* are brought in contact with the bead ring *r* as shown in FIG. 2*b* to slidably press down that arcuate portion of the bead ring *r* which lies between the driving rollers *d* and *d'* so as to correct the irregularity of the curvature of the arcuate portion of the bead ring *r*.

Subsequently, the swing lever *l* is swung upwards to rotate the guide roller *g* along the arcuate surface of the restraining guide piece *b* with the aid of a friction wheel *w* formed integral with the guide roller *g*. The friction wheel *w* is urged against the arcuate surface *e* of the restraining guide piece *b* to rotate the touch roller *t* around its own axis and along the periphery of the guide roller *g*, thus bringing back the obliquely cut end *i* of the apex rubber strip *s* into a position near the point of contact between the bead ring *r* and the guide roller *g* as shown in FIG. 2*c*.

Thus, the guide roller g serves to stick the obliquely cut end *i* of the apex rubber strip *s* on the outer periphery of the bead ring *r*, particularly on the outer periphery of that arcuate portion which lies between the driving rollers *d* and *d'* with the aid of the upward force of the swing lever *l*.

The touch roller *t* is separated sidewards from the point of contact between the guide roller *g* and the bead ring *r* as shown in FIG. 2*c*.

The obliquely cut end *i* of the apex rubber strip s may be stuck on the outer periphery of the bead ring *r* by means of an adhesive property of the apex rubber strip *s* or by a rubber cloth wrapping or covering the bead ring *r*. For this purpose, use may be made of a cementings agent.

Then, the restraining guide piece *b* becomes inoperative as shown in FIG. 2*d*. That is, the friction wheel *w* is separated from the arcuate surface *e* of the restraining guide piece *b* to permit a free rotation of the guide roller *g*. The subsequent rotation of the driving rollers *d* and *d'* makes it possible to guide that portion of the apex rubber strip *s* which succeeds the front end *i'* of the apex rubber strip *s* stuck on the bead ring *r* along the outer periphery of the bead ring *r* through the space between the driving roller *d* and the bead ring *r* and press it against the bead ring *r* and stick on the latter as shown in FIG. 2*d*.

If the front end *i'* of the apex rubber strip *s* stuck on the bead ring *r* arrives at a position which is about one half the periphery of the bead ring *r*, the swing lever *l* together with the guide roller *g* begin to swing downward until the guide roller *g* reaches its retracted position shown in FIG. 2*e*. Then, the front end *i'* of the apex rubber strip *s* arrives at the air senser *a*. In this position, the cutter *c* occupies its elevated position ready to perform its cutting operation.

Figure 2F:
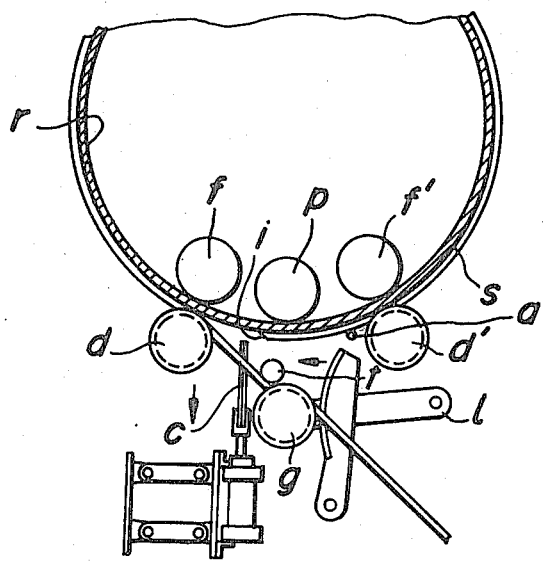

If the front end *i'* of the apex rubber strip *s* together with the bead ring *r* have rotated one turn and passed over the driving roller *d'*, the air sensor *a* arranged near the driving roller *d'* and across the passage of the front end *i'* of the apex rubber strip s serves to detect the arrival of the front end *i'* to produce a detection signal which causes the driving rollers *d* and *d'* to be stopped for a duration from the step shown in FIG. 2*e* to the step shown in FIG. 2*f*.

Then, the cutter c in the elevated position is operated to cut that portion of the apex rubber strip *s* which lies between the driving roller *d* and the guide roller *g* as shown in FIG. 2*f*.

This cutting position is determined such that the rear end of the apex rubber strip *s* cut coincides with the front end *i'* thereof.

Figure 2G:
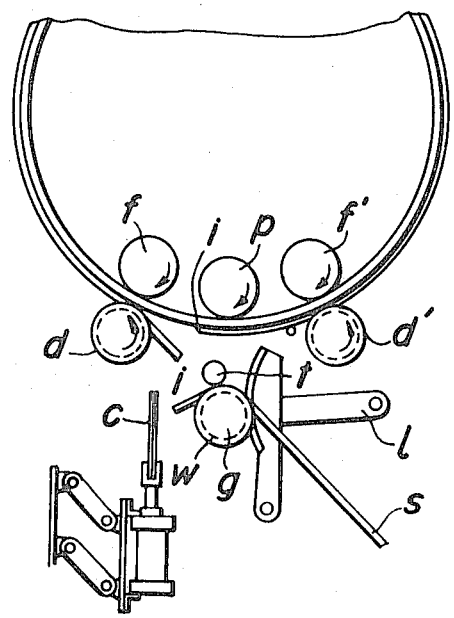
Figure 2H:
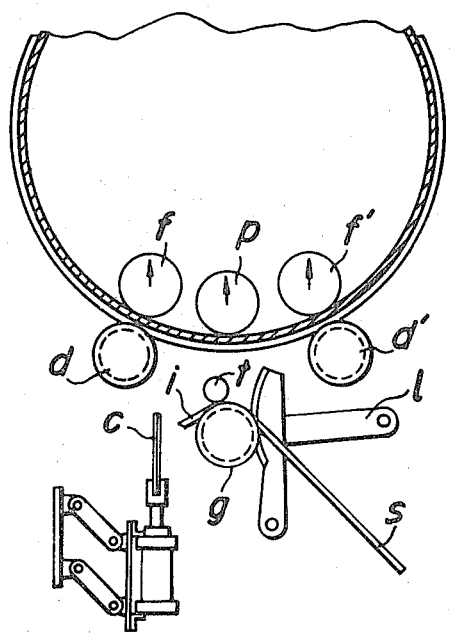
Figure 3A:
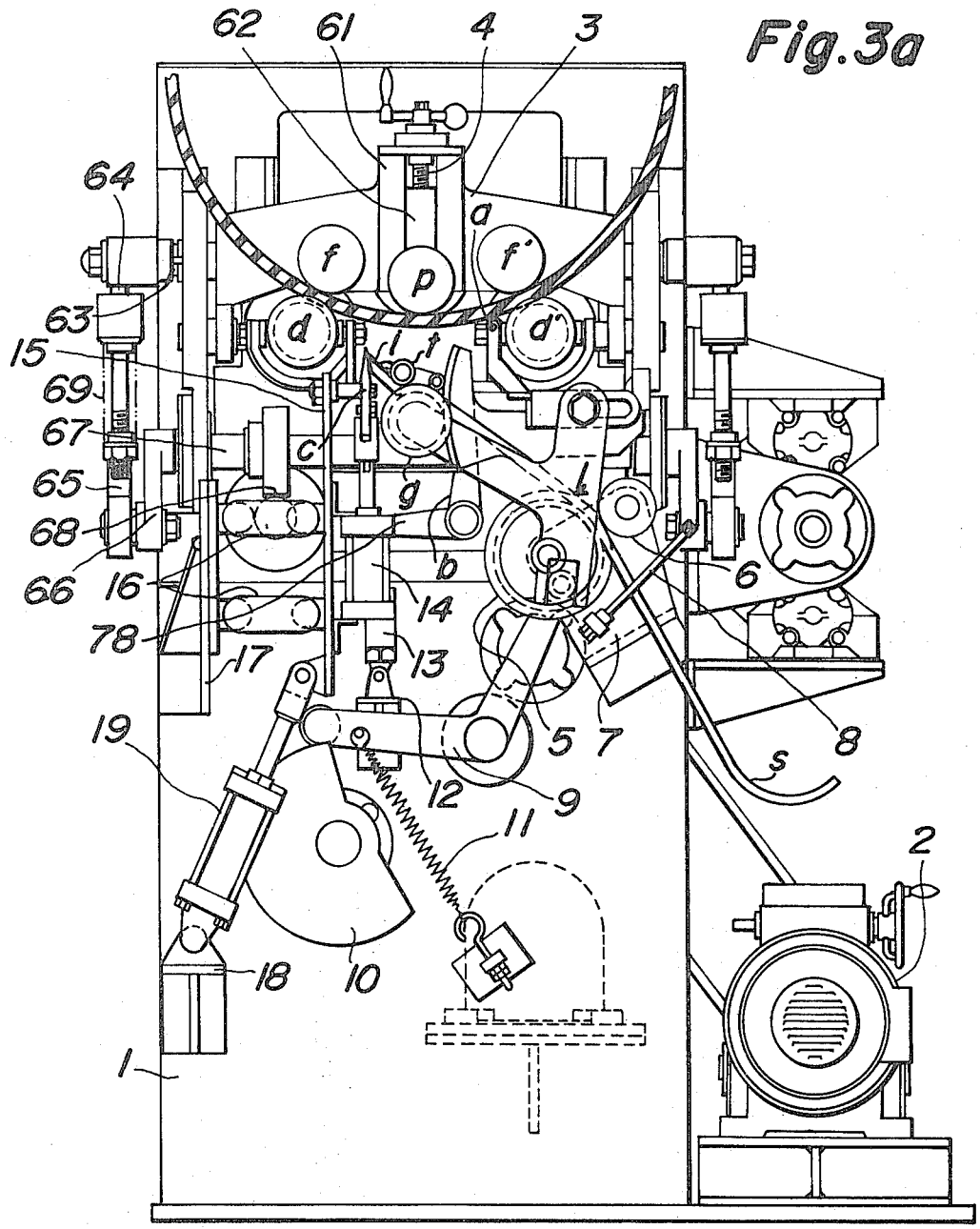
FIG. 3a is a front elevation of an apparatus according to the invention.
Figure 3B:
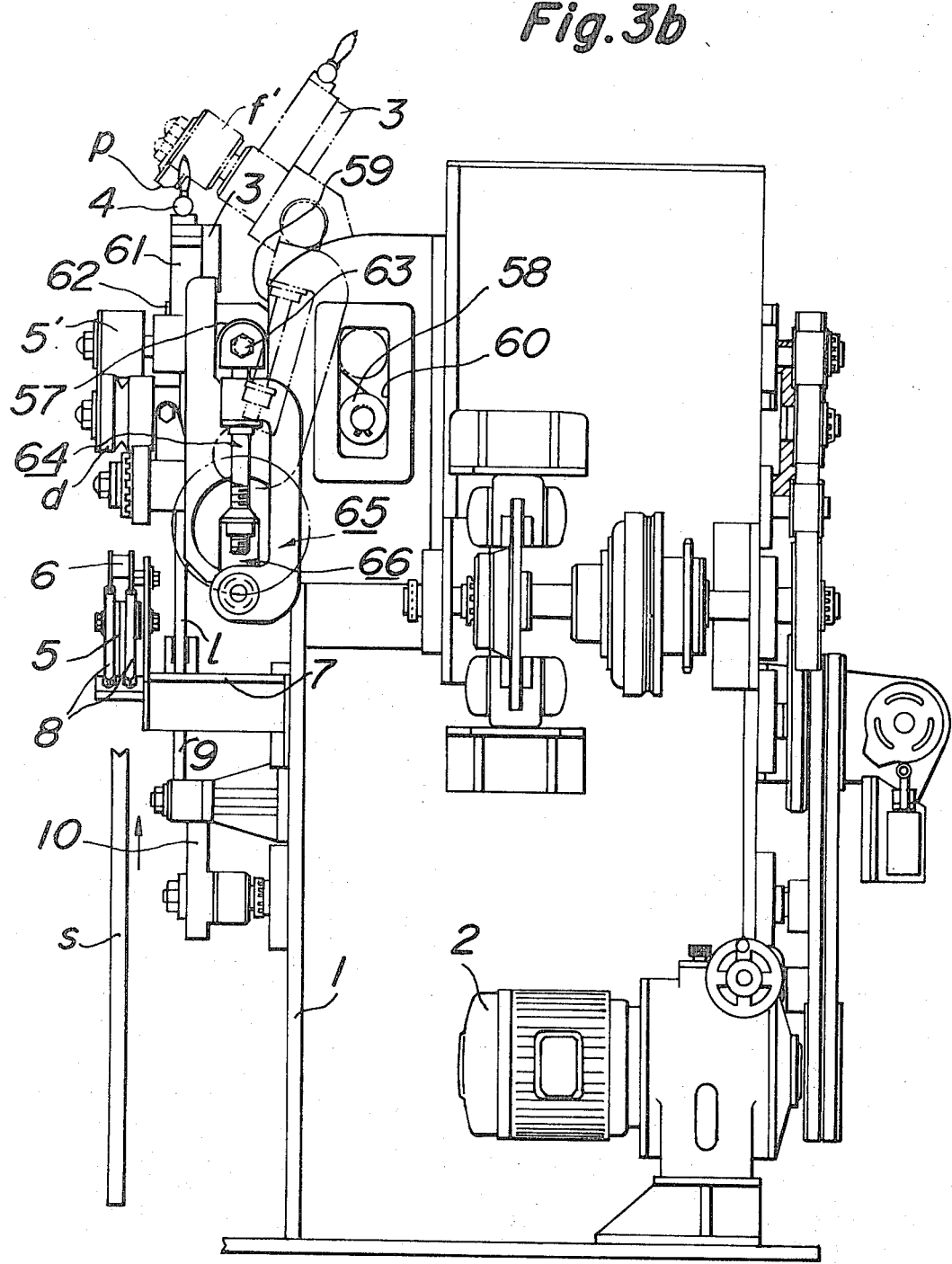
FIG. 3b shows similarly to FIG. 3a a side elevation.

Then, the cutter *c* is moved downwards and becomes inoperative and the rear end *i''* of the apex rubber strip *s* and the front end *i'* thereof hang down from the driving roller *d* and guide roller *g*, respectively, as shown in FIG. 2*g*. Then, the driving rollers *d* and *d'* are operated again to reliably stick the apex rubber strip *s* around the bead ring *r* as shown in FIG. 2*h*.

Subsequently, the driving rollers *d* and *d'* are stopped and the pressure roller *p* and the driven rollers *f* and *f'* are again moved to their retracted positions shown in FIG. 2*a*. Then, the bead ring *r* is removed from the driving rollers *d*, *d'* and a new bead ring *r* is disposed on the driving rollers *d* and *d'*. Then, the above mentioned steps are repeated to stick the succeeding apex rubber strip *s* on the new bead ring *r*.

An apparatus for carrying out the above mentioned method according to the invention will now be described with reference to FIGS. 3 to 9.

The apparatus according to the invention comprises a frame work 1 which is provided at its front side with the driving rollers *d* and *d'* adapted to be driven through a transmission mechanism (not shown) by an electric motor 2.

The pressure roller *p* slightly pressing downwards that arcuate portion of the bead ring *r* which lies between the driving rollers *d* and *d'* and the driven rollers *f*, *f'* are rotatably mounted on a supporting frame 3. The supporting frame 3 is adapted to be moved upwards and downwards and also inclined backwards. Provision is made for an adjustable screw 4 which is capable of adjusting the upward and downward movements of the pressure roller *p* with respect to the supporting frame 3.

The frame work 1 is provided at its front side and at substantially center thereof with a guide wheel 5 for guiding the apex rubber strip s formed, for example, by an extruder (not shown) and with a touch roller 6. The guide wheel 5 and the touch roller 6 are rotatably mounted on a bracket 7 whose inlet side is provided with a pair of guide poles 8. The guide roller *g* adapted to stick under pressure the apex rubber strip *s* on the outer periphery of the bead ring *r* is rotatably mounted on the one end of bifurcated arms of a Y-shaped swing lever *l* pivoted at the top end of the frame work 1. The end of the outer bifurcated arm of the swing lever *l* is brought into engagement with the end of one arm of a bell crank 9 pivotally mounted at the frame work 1. The end of the other arm of the bell crank 9 is driven by a pressure cam 10 pivotally mounted on the frame work 1. The bell crank 9 is always brought into engagement with the pressure cam 10 by means of a spring 11.

The restraining guide piece *b* which causes the guide roller *g* to freely rotate only when the guide roller *g* is positioned near the bead ring *r* is pivotally mounted at its bent portion on the frame work 1 and is formed in bell crank shape whose vertical arm is provided at its front side with the arcuate surface *e*. The free end of the horizontal arm of the restraining guide piece *b* is brought into engagement with a hydraulic lifter 13 pivotally mounted on a bracket 12 so as to separate the vertical arm from the guide roller *g*.

In order to move the cutter *c* upwards and downwards between the guide roller *g* and the driving roller $d$, the cutter $c$ and its hydraulic lifter 14 are secured to a supporting frame 15 which is secured through horizontal links 16 to a bracket 17. The supporting frame 15 is connected at its lower end through a hydraulic lifter 19 to a bracket 18.

In FIG. 4 is shown a mechanism for feeding the bead ring $r$ one by one and feeding continuously the apex rubber strip $s$ to the driving rollers $d$ and $d'$.

The frame work 1 comprises a supporting frame 22 whose holding beams 21 are arranged adjacent to the frame work 1 and adapted to hold the bead ring $r$. The holding beams 21 are provided at their outlet and inlet sides with hydraulic thrusters 23 and 24, respectively, which serve as stoppers for the bead ring $r$. The supporting frame 22 is provided thereon with an inclined chute 25 for guiding the bead ring $r$. Between the supporting frame 22 and the inclined chute 25 is arranged a hydraulic lifter 27 which can operate a stopper 26 such that the stopper 26 is projected out of the base of the inclined chute 25 to separate the outer periphery of the bead ring $r$ from the succeeding bead rings $r$. The bead ring $r$ thus separated is held by the stopper 24 and is also separated from the outer periphery of the succeeding bead ring $r$.

The base of the inclined chute 25 consists of a roller chain 28 made up of a number of freely rotatable rollers for ease of supply movement of the bead rings $r$ along the inclined chute 25.

To one side wall of the inclined chute 25 is secured brackets 29 and 30 which are provided with a guide belt 31 and a guide wheel 32, respectively. The guide belt 31 serves to continuously feed the apex rubber strip $s$ delivered from the extruder $h$ through the guide wheel 32 with the aid of belt wheels 35 and 36 driven by transmission mechanism 33 and 34.

The apex rubber strip $s$ is sagging between the guide belt 31 and the guide wheel 32 as shown in FIG. 4a.

The numerals 37 and 38 designate guide gate poles for the guide belt 31 and guide wheel 32, respectively.

Figure 5A:
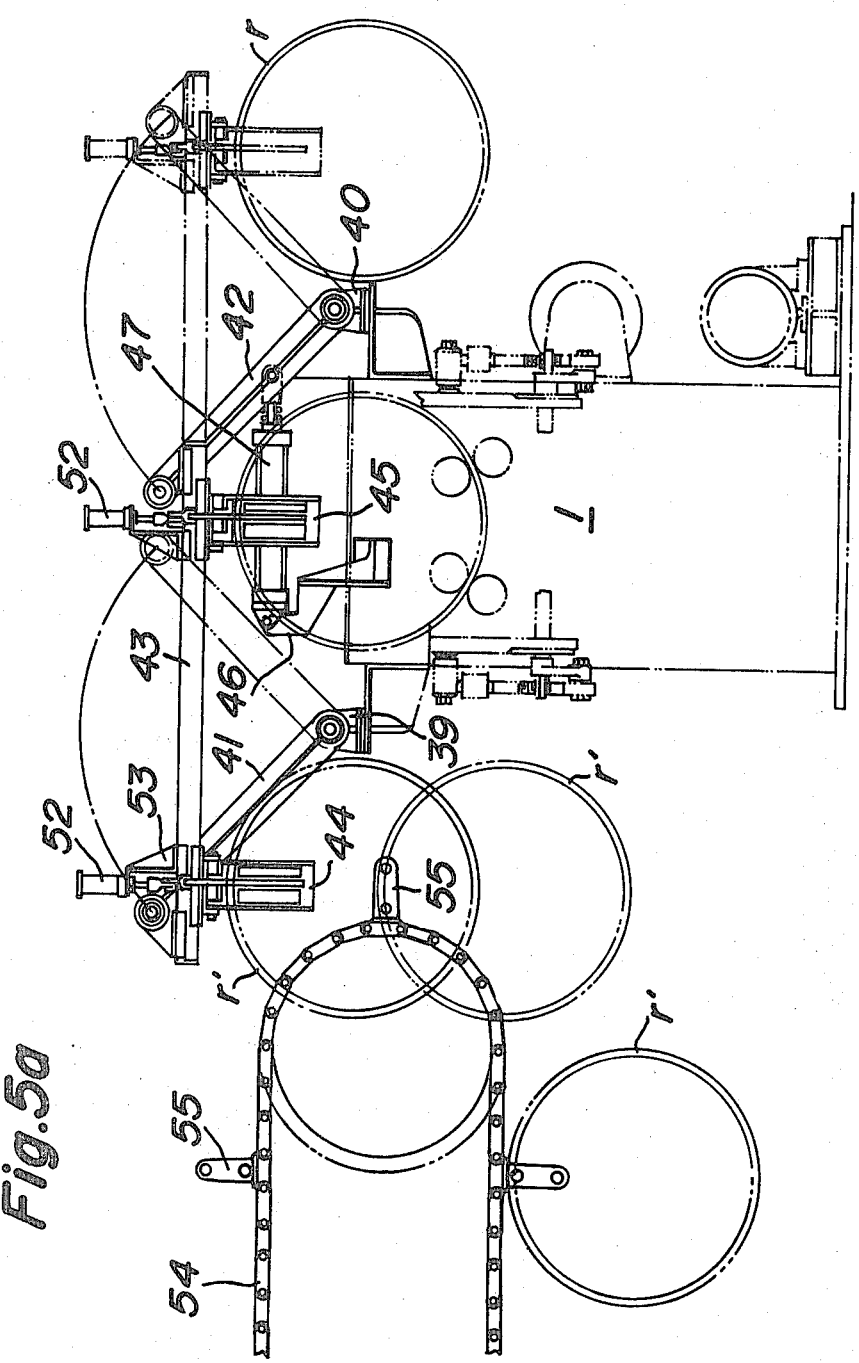
FIG. 5a is a front elevation of the relative arrangement of the mechanism for detachably feeding the bead rings.
Figure 5B:
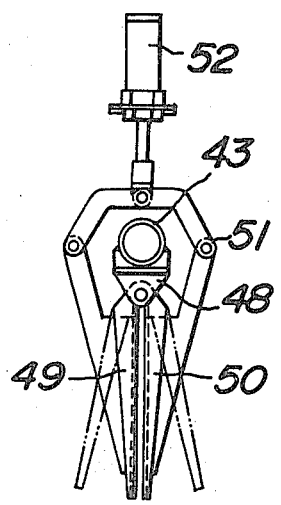
FIGS. 5b and 5c are side elevations of detached parts of a detail of FIG. 5a, respectively.
Figure 5C:
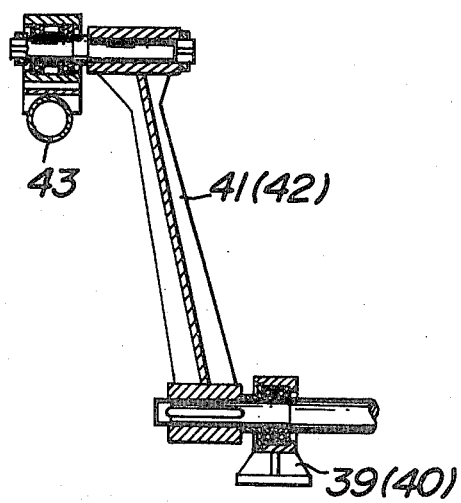

In FIG. 5 is shown a mechanism for loading and unloading the bead ring $r$, which is capable of loading the bead ring $r$ on the supporting frame 22 (FIG. 4a) and then unloading it therefrom. The frame work 1 is provided at its upper part with brackets 39 and 40 projecting from the left and right sides of the frame work 1, respectively. On the brackets 39 and 40 are pivotally mounted a pair of parallel links 41 and 42, respectively, whose free ends are interconnected by a rod 43 which is provided at its ends with a pair of bead ring carriers 44 and 45, respectively. Between a bracket 46 secured to the frame work 1 and one of the links 42 is connected a hydraulic thruster 47 which can swing the parallel links 41 and 42 in synchronism.

In FIG. 5b is shown in details the bead ring carrier 44 or 45. The rod 43 is provided at its lower side with a hanger 48 beneath which are pivotally mounted a pair of jaws 49 and 50 which are adapted to embrace the bead ring $r$ through a link mechanism 51 when hydraulic pusher 52 is operated. The hydraulic pusher 52 is secured to a bracket 53 provided on the rod 43.

The bead ring $r$ arrived at the supporting frame 22 and the bead ring $r'$ with the apex rubber strip $s$ stuck thereon are clamped by the jaws 49 and 50 of the bead ring carriers 45 and 44, respectively, in the positions shown by chain line in FIG. 5a. If the thruster 47 is operated to retract its end connected to the link 42 to the position shown by full line, the bead ring $r$ is loaded and disposed on the driving rollers $d$ and $d'$, while the bead ring $r'$ stuck with the apex rubber strip $s$ is unloaded therefrom.

The bead ring $r'$ stuck with the apex rubber strip $s$ and unloaded from the driving rollers $d$ and $d'$ is suspended from a hanger 55 provided on a chain conveyor 54 rotating near the unloaded position of the bead ring carrier 44. The bead ring $r'$ is thus temporarily stocked or delivered through a succeeding flipping step to a step of manufacturing the tire.

In case of stocking the bead rings $r'$ they are arranged side by side and suspended one by one by the hanger 55 and then the chain conveyor 54 is moved forwards by one step for ease of stocking a number of bead rings $r'$.

As above mentioned, the bead ring $r'$ with the apex rubber strip $s$ stuck thereon is unloaded from the driving rollers $d$ and $d'$. Then, in order to load or dispose a new bead ring $r$ on the driving rollers $d$ and $d'$, the pressure roller $p$ and the driven rollers $f$ and $f'$ must be retracted from the position where they are in contact with the bead ring $r$. For this purpose, the supporting frame 3 adapted to be moved upwards and downwards and inclined backwards is provided at its back side with rear arms 56 symmetrically arranged and projecting downwards as shown in FIG. 6. Each rear arm 56 is provided at its front and rear sides with a pair of rotary wheels 57 and 58 which are rotatable along guide passages 59 and 60 provided in the frame work 1, respectively. The supporting frame 3 is also provided at its front center with a screw carriage 61 whose adjustable screw 4 serves to adjust the vertical position of a slidable member 62 provided at its lower end with the pressure roller $p$ pivotally mounted thereon. The supporting frame 3 may be provided with the driven rollers $f$ and $f'$ which are pivotally mounted at each side of the pressure roller $p$.

The guide passage 59 is formed by vertical walls and curved walls curved rearwards from the top end of the vertical walls. The guide passage 60 is formed by a vertically elongated opening. Thus, if the supporting frame 3 is moved upwards, in the first place the supporting frame 3 is moved upwards until the rotary wheel 58 arrives at the top end of the guide passage 60, then the rotary wheel 57 rotates along the curved walls of the guide passage 59 to move the supporting frame 3 into a position shown by chain line in FIG. 6b, with the result that the pressure roller $p$ is retracted to a position where the pressure roller $p$ does not obstruct the loading of the bead ring $r$.

In order to move upwards the supporting frame 3, provision is made for transmission bar 64 whose upper end is pivotally connected to a shaft 63 of the rotary wheel 57. To the lower end of the transmission bar 64 is detachably connected a U-shaped link 65 whose lower end is pivotally connected to a crank arm 66. To the crank arm 66 is secured a crank shaft 67 which is connected to a transmission gear 68 driven by the electric motor 2 shown in FIG. 3a.

Between the upper end of the transmission bar 64 and the upper end of the U-shaped link 65 is arranged a compression spring 69 which serves to slightly urge the pressure roller $p$ against the bead ring $r$.

Figure 6A:
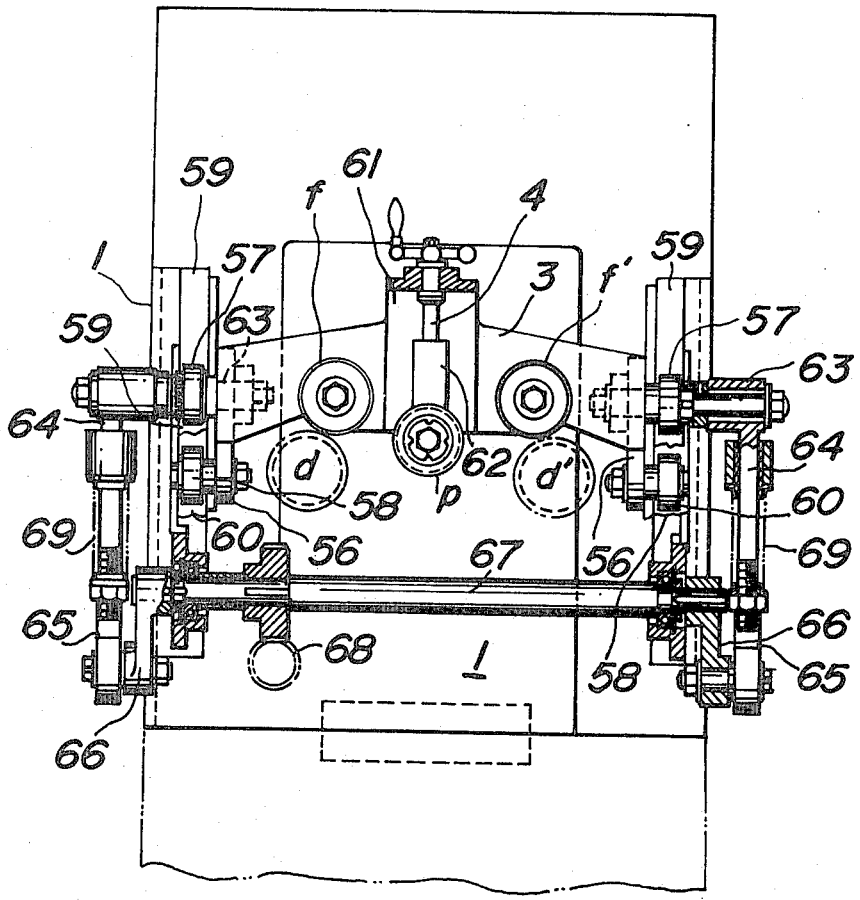
FIG. 6a is a front elevation of the mechanism for rotatably supporting the bead rings.
Figure 6B:
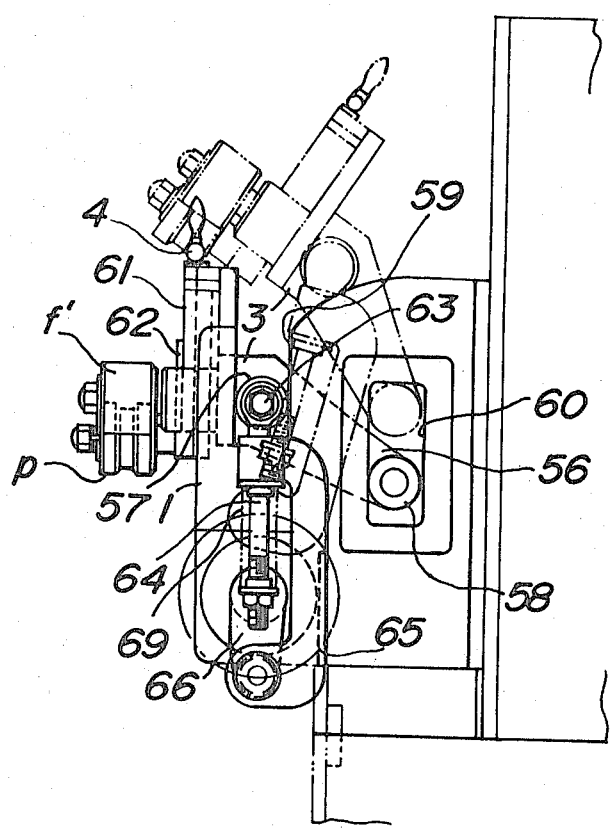
FIG. 6b shows similarly to FIG. 6a a side elevation.

The transmission gear 68 is connected to the motor 2 through a transmission mechanism (not shown) which is adapted to temporarily stop the crank shaft 67 at each position of the supporting frame 3 shown by full line and chain line in FIGS. 6a and 6b.

Figure 7A:
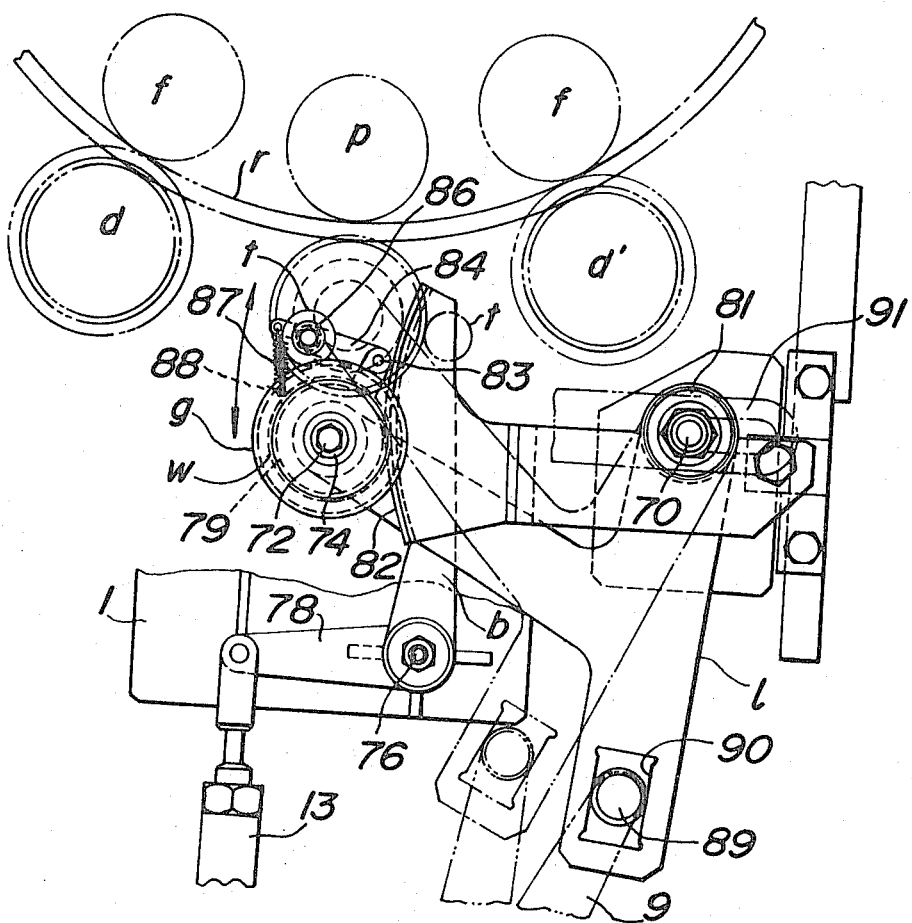
FIG. 7a is a front elevation of the mechanism for urging the apex rubber strip against the bead rings.
Figure 7B:
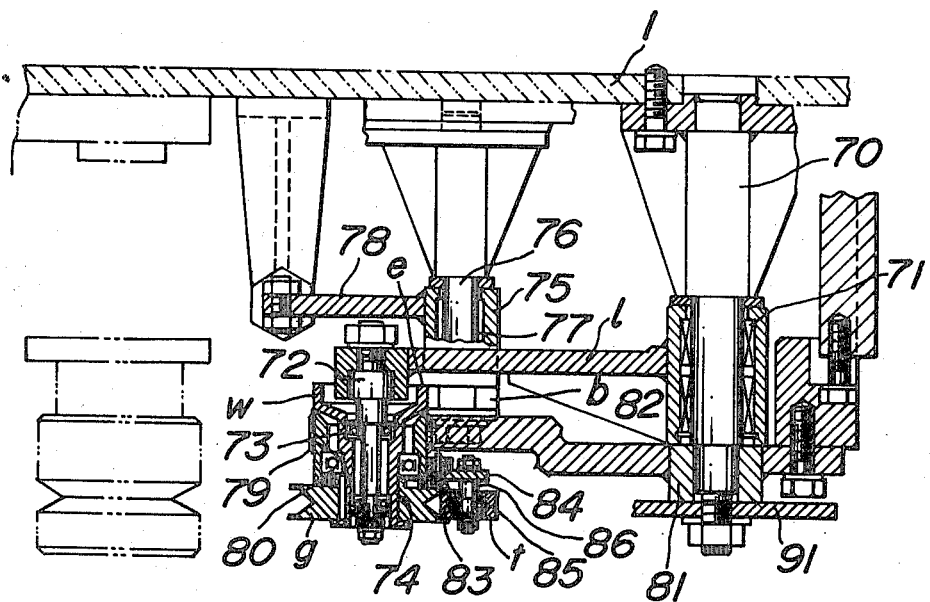
FIG. 7b shows similarly to FIG. 7a a plan view, in which the main parts are shown in a sectional view.

The guide roller g for guiding the apex rubber strip s under pressure along the bead ring r which is driven by the driving rollers d and d' is made integral with a rotary drum 74 rotatably journalled in a ball bearing 73 and keyed to a supporting shaft 72 as shown in FIG. 7b. The supporting shaft 72 is secured to the free end of the Y-shaped swing lever l pivotally mounted through a needle bearing 71 on a shaft 70 projected from the frame work 1 as shown in FIG. 7b.

The outer diameter at one end of the rotary drum 74 is enlarged to form the friction wheel w which is urged against the arcuate surface e of the restraining guide piece b. The arcuate surface e is lined with a friction material.

The restraining guide piece b is provided at its boss portion 75 with a shaft 76 projecting from the frame work 1 and rotatably supported by a needle bearing 77. The boss portion 75 of the restraining guide piece b is provided with a transverse bar 78 so as to form a bell crank shaped restraining guide piece b, the free end of the transverse bar 78 being pivotally connected to the hydraulic lifter 13.

The rotary drum 74 is adapted to be freely rotated about the supporting shaft 72 when the guide roller g and the restraining guide piece b are inoperative with respect to the friction wheel w. Thus, during the step in which the hydraulic lifter 13 is operated to urge the guide roller g against the bead ring r, the rotary drum 74 is rotated along the arcuate surface e of the restraining guide piece b.

The rotary drum 74 is provided around its outer periphery with a gear wheel 79 arranged between the guide roller g and the friction wheel w and rotatably journalled in a ball bearing 80. The gear wheel 79 threadably engages with a fixed sector gear 82 secured to the end of the boss of the swing lever l pivotally supported by the shaft 70. From the outer periphery of the gear wheel 79 projects radially a projection 83 to which is pivoted one end of a lever arm 84. Near the free end of the lever arm 84 is arranged the touch roller t adapted to be in contact with the guide roller g and rotatably supported through a ball bearing 85 by a supporting shaft 86. Between the free end of the lever arm 84 and a projection 88 radially projecting from the gear wheel 79 is arranged a spring 87 which plays a role of forming the touch roller t against the outer periphery of the guide roller g.

The retracted position of the guide roller g is shown by full line and the position where the guide roller g is in contact with the bead ring r is shown by chain line in FIG. 7a. FIG. 7b shows the relative position of the guide roller g with the touch roller t shown by chain line in FIG. 7a.

That is, in the retracted position of the guide roller g shown by full line in FIG. 7a, the touch roller t occupies a second quadrant of the guide roller g. The operating end 89 of the bell crank 9 movable in cooperation with the cam 10 shown in FIG. 3a acts upon a hole 90 formed in the Y-shaped swing lever l to swing it in clockwise direction in FIG. 7a by means of the spring 11 to a chain line position. During this movement of the swing lever l the guide roller g is rotated along the arcuate surface e of the restraining guide piece b and the gear wheel 79 is brought into engagement with the fixed sector gear 82 and hence rotated along the latter, with the result that the projections 83 and 88 integral with the gear wheel 79 together with the lever arm 84 are moved to the first quadrant position of the guide roller g. All of these members in this case are shown in section in FIG. 7b.

As above mentioned, if the guide roller g is moved towards the bead ring r and rotated along the arcuate surface e of the restraining guide piece DDE, the front end i' of the apex rubber strip s held between the bead ring r and the touch roller t is drawn into that position which lies between the bead ring r and the guide roller g. In this step the touch roller t is retracted to a position where the touch roller t does not obstruct the above mentioned contact between the bead ring r and the guide roller g. Subsequently, the guide roller g is released from the position controlled by the restraining guide piece b and hence can guide the apex rubber strip s in a smooth manner. Even when the guide roller g is retracted from the bead ring r, objectionable frictional force is not subjected to the apex rubber strip s.

Figure 8A:
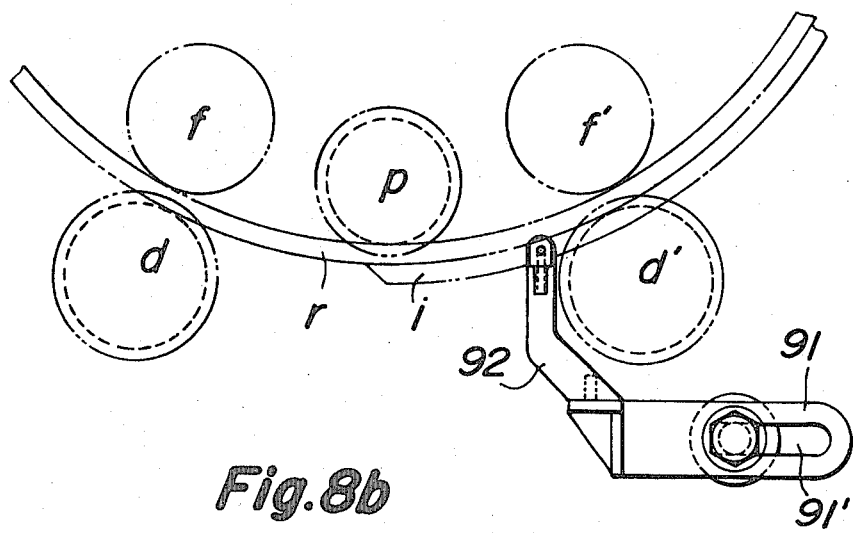
FIG. 8a is a front elevation of the device for detecting the arrival of the front end of the apex rubber strip stuck on the bead ring.
Figure 8B:
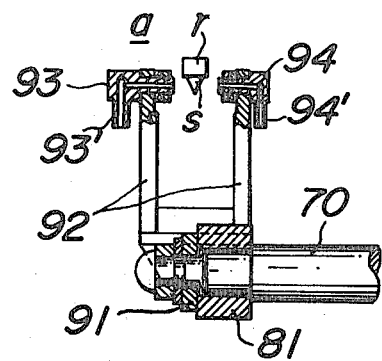
FIG. 8b shows similarly to FIG. 8a a side elevation, in which parts are shown in a sectional view.

In FIGS. 8a and 8b is shown a part of a mounting plate 91. The mounting plate 91 is provided at its one end with an elongate hole 91' and at the other end with an air senser a. The air senser a comprises a pair of brackets 92, 92 arranged in opposition at both sides of the apex rubber strip s. FIGS. 8a and 8b show the position of the apex rubber strip s whose front end i' stuck on the bead ring r has passed through a nozzle of the air senser a and the detection has been performed.

The air senser a comprises a nozzle 93 which can eject an air stream supplied through a hose (not shown) connected to an inlet fitting 93' from an air supply source (not shown). The air jet from the nozzle 93 after passing through the apex rubber strip s is subjected to a pressure receiving piece 94 and then applied through an outlet fitting 94' and a hose (not shown) connected thereto to a pressure responsive meter (not shown) which can detect the presence or absence of the apex rubber strip s stuck on the bead ring r.

There is risk of the air senser a being misoperated prior to the arrival of the apex rubber strip s owing to the out of roundness of the bead ring r and to improper wrapping or covering of the bead ring r. Such misoperation of the air senser a is avoided by slightly pressing down by the pressure roller p that arcuate portion of the bead ring r which lies between the driving rollers d and d' and hence by making the curvature of the arcuate portion of the bead ring r constant.

Figure 9A:
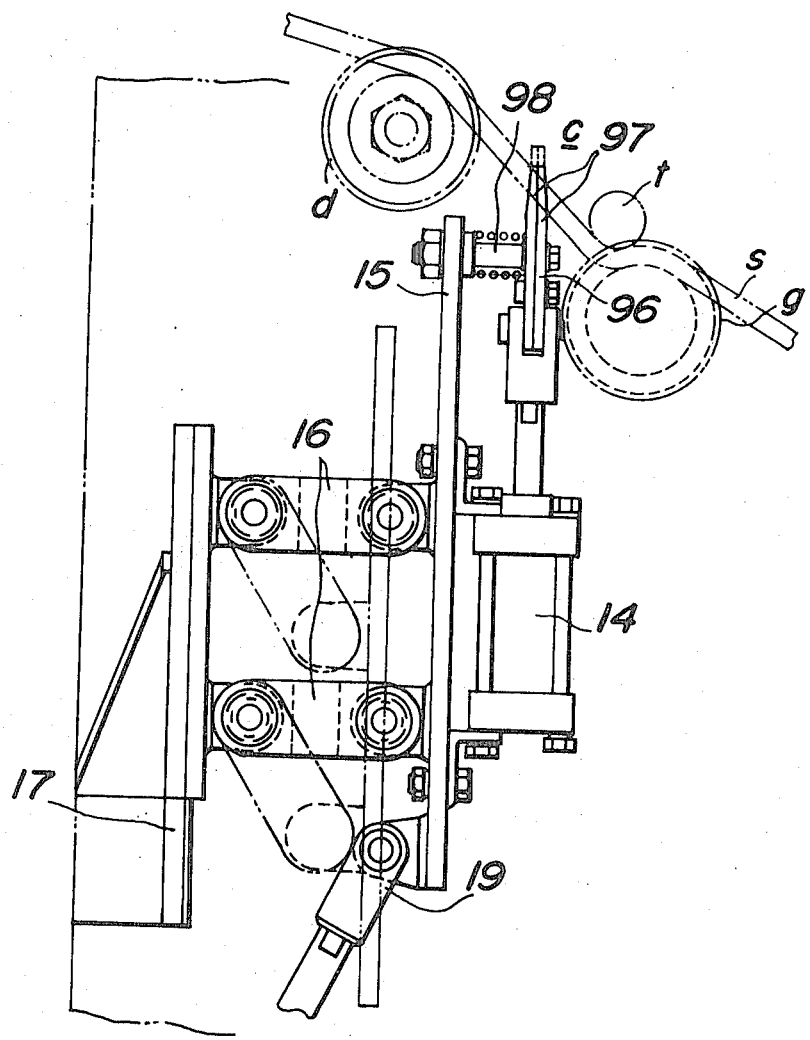
FIG. 9a is a front elevation of the cutter for obliquely cutting to apex rubber strip according to the invention.
Figure 9B:
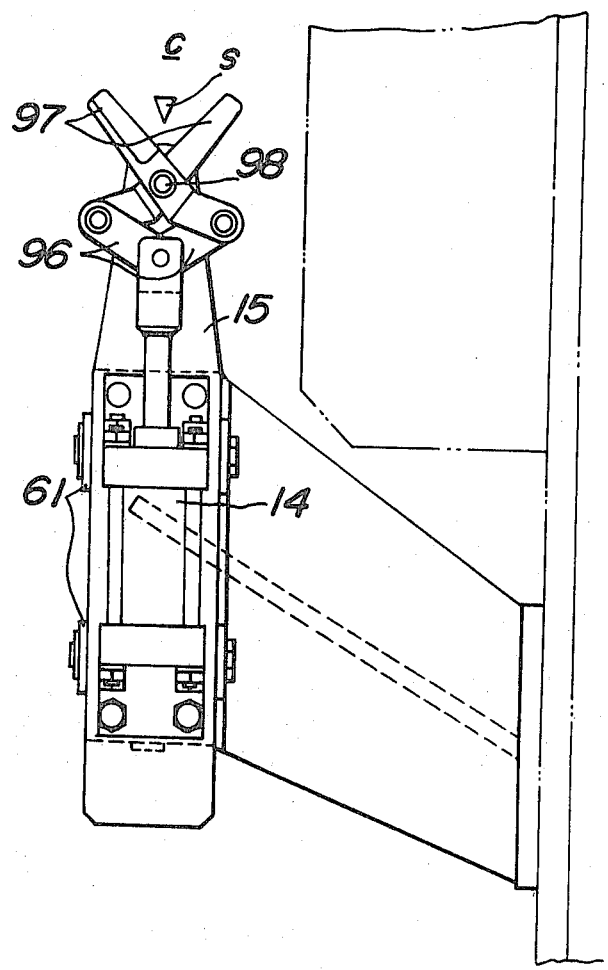
FIG. 9b shows similarly to FIG. 9a a side elevation.

In FIGS. 9a and 9b is shown the cutter c which consists of a pair of scissors 97 whose lower ends are pivotally connected to a pair of links 96 operable in response to the up and down movements of the hydraulic lifter 14 secured to the supporting frame 15. The scissors 97 are pivotally supported by a shaft 98 secured to the supporting frame 15 and wound by a spring 99 for closing the scissors 97.

As described in details hereinbefore, the invention makes it possible to correct the curvature of that arcuate portion of the bead ring which lies between the driving rollers irrespective of the out of roundness and the improper wrapping or covering of the bead ring. Thus, the invention provides an economical way of accomplishing the sticking of the soft and delicate apex rubber strip on the bead ring in smooth, reliable and efficient manner without subjecting any objectional exterior force to the apex rubber strip, and can be applied effectively to the automatic manufacture of pneumatic tires and contributes greatly to this field of technique.

What is claimed is:

1. A method of sticking an apex rubber strip on bead rings for use in pneumatic tires comprising the steps of disposing a bead ring on a pair of driving rollers and supporting said bead ring between said driving rollers on the one hand and at least one pressure roller which can correct unevenness of the curvature of that arcuate portion of said bead ring which lies between said driving rollers on the other hand, sticking an obliquely cut end of an apex rubber strip on the outer periphery of said arcuate portion of the bead ring with the aid of a guide roller movable between a first position where said guide roller is urged against the outer periphery of said arcuate portion of the bead ring and a second position where said guide roller is retracted from said first position, rotating said bead ring by said driving rollers to stick that portion of said apex rubber strip which succeeds said obliquely cut end stuck thereon and delivered through said guide roller on the outer periphery of said bead ring and then retracting said guide roller to said second position, detecting the arrival of said obliquely cut end stuck on the apex rubber strip at the outer periphery of said arcuate portion of the bead ring to stop said driving rollers and then obliquely cut that portion of the apex rubber strip which lies between the guide roller and the driving roller, re-starting the rotation of said driving rollers to stick the apex rubber strip thus cut on the bead ring and releasing said pressure roller, and finally replacing said bead ring with said apex rubber strip stuck thereon with a new bead ring.

2. Apparatus for sticking an apex rubber strip on bead rings for use in pneumatic tires, comprising means for rotatably supporting a bead ring and consisting of a pair of driving rollers arranged along the outer periphery of said bead ring and spaced one from the other and at least one pressure roller adapted to slightly increase the curvature of that arcuate portion of said bead ring which lies between said driving rollers; means for urging an apex rubber strip against said bead ring and consisting of a guide roller for guiding said apex rubber strip to be stuck on the outer periphery of said bead ring, a touch roller which is in engagement with said guide roller and adapted to be rotated in reciprocation along the periphery of said guide roller, and an operating mechanism including a restraining guide piece and adapted to move said guide roller from a first position where said guide roller makes contact with the outer periphery of said bead ring under pressure to a second position where said guide roller is retracted from the outer periphery of said bead ring, said guide roller being permitted to freely rotate during the movement of said guide roller towards said first position and caused to be rotated in a direction such that the obliquely cut end of said apex rubber strip clamped between said guide roller and said touch roller is retracted; means for detecting the arrival of that end of said apex rubber strip which is stuck on the outer periphery of said bead ring at said arcuate portion of the bead ring in response to the rotation of said driving rollers; and a cutter for obliquely cutting that portion of said apex rubber strip which lies between said guide roller located at said second retracted position and said driving roller.

* * * * *